United States Patent [19]

Letoquart

[11] Patent Number: 4,617,569
[45] Date of Patent: Oct. 14, 1986

[54] PROCESS FOR INCREASING THE RANGE AND PARTICULARLY THE PROTECTION AGAINST JAMMING OF AN MLS LANDING SYSTEM AND MEANS FOR PERFORMING THIS PROCESS

[75] Inventor: Bruno Letoquart, Paris, France
[73] Assignee: Thomson-CSF, France
[21] Appl. No.: 622,341
[22] Filed: Jun. 19, 1984
[30] Foreign Application Priority Data Jun. 21, 1983 [FR] France ................. 8310239

[51] Int. Cl.$^4$ ............................................. G01S 1/18
[52] U.S. Cl. .................................................. 342/412
[58] Field of Search ............... 343/412, 408, 413, 407, 343/17.7

[56] References Cited

U.S. PATENT DOCUMENTS

| | | | |
|---|---|---|---|
| 3,715,757 | 2/1973 | Toman | 343/407 |
| 4,306,238 | 12/1981 | Enein | 343/408 |
| 4,306,239 | 12/1981 | Enein | 343/408 |
| 4,333,081 | 6/1982 | Höfgen | 343/407 |
| 4,489,326 | 12/1984 | Studenny | 343/408 |
| 4,532,517 | 7/1985 | LaBerge et al. | 343/17.7 |

OTHER PUBLICATIONS

Onodera et al., "Development of Approach Elevation Equipment in MLS," NEC Research and Development, No. 59, Oct. 1980, pp. 34–45.
Letoquart et al., "Le MLS-Un Exemple d'Utilisation du Microprocesseur," Navigation, vol. 29, No. 114, Apr. 1981, pp. 174–187.

Primary Examiner—Theodore M. Blum
Assistant Examiner—David Cain
Attorney, Agent, or Firm—Pollock, VandeSande & Priddy

[57] ABSTRACT

A process and means for increasing the range and the protection against jamming of a MLS system. It consists of transmitting a supplementary or reinforced preamble for each MLS function or group of MLS functions, via a scanning antenna used for the azimuth function, during the time when the latter is not normally used. This supplementary preamble consists of a certain number, e.g. four preferably accelerated scans, the variation between these scans being characteristic of the following function or functions.

15 Claims, 14 Drawing Figures

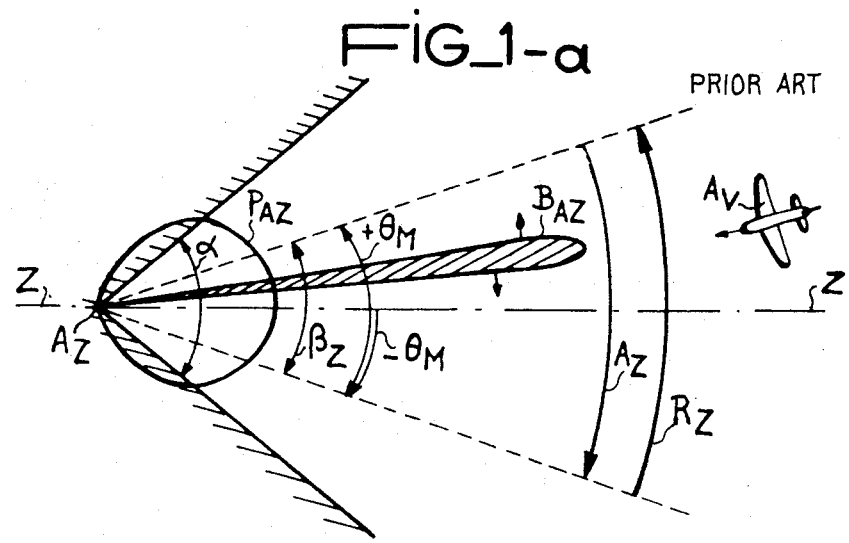
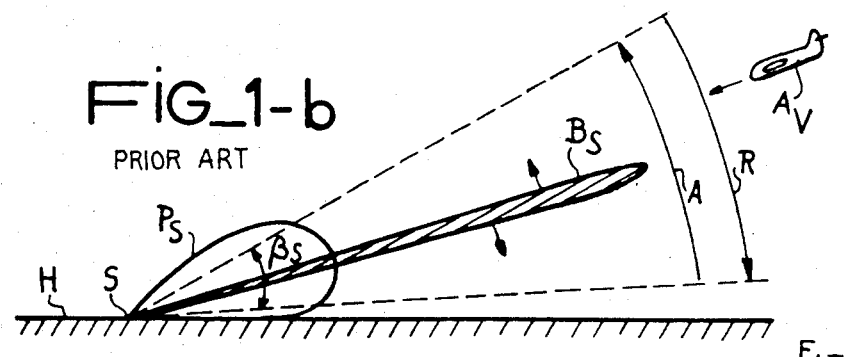
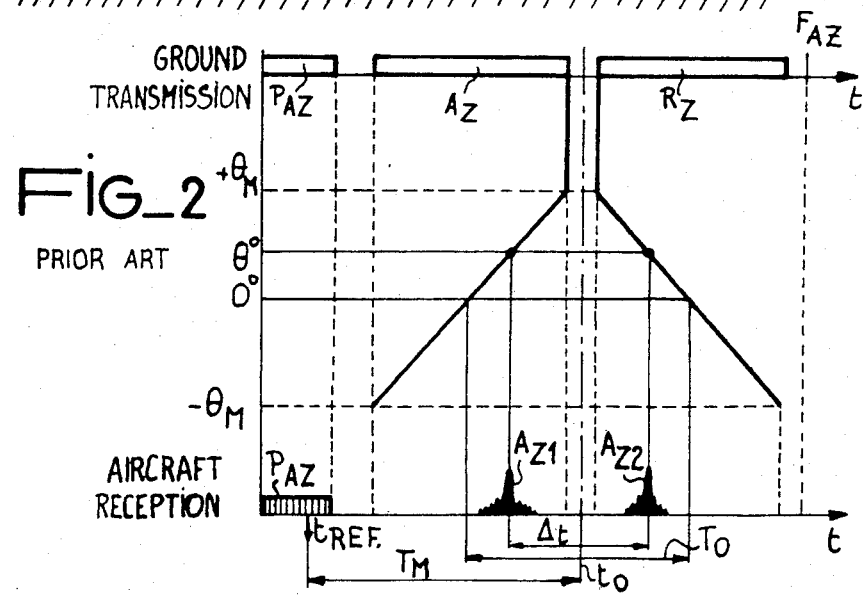

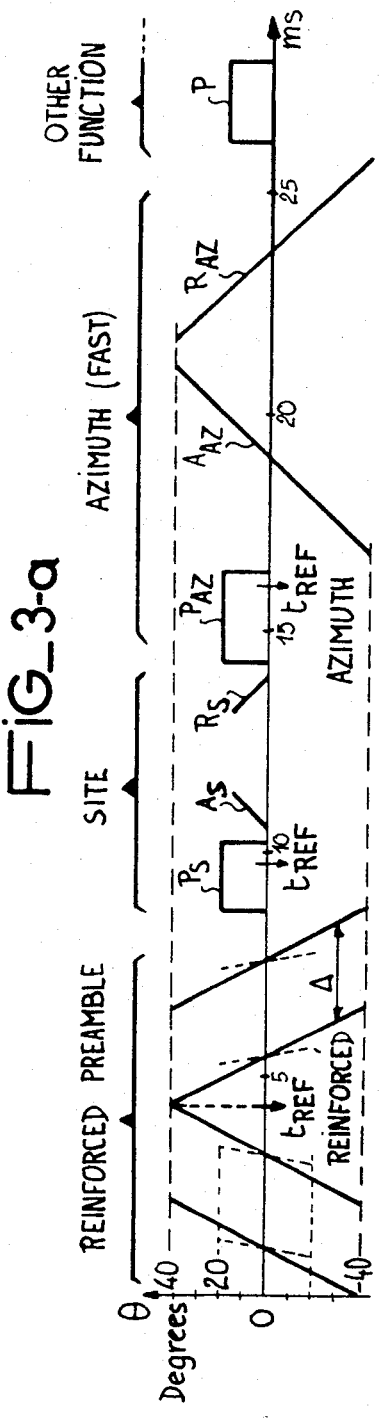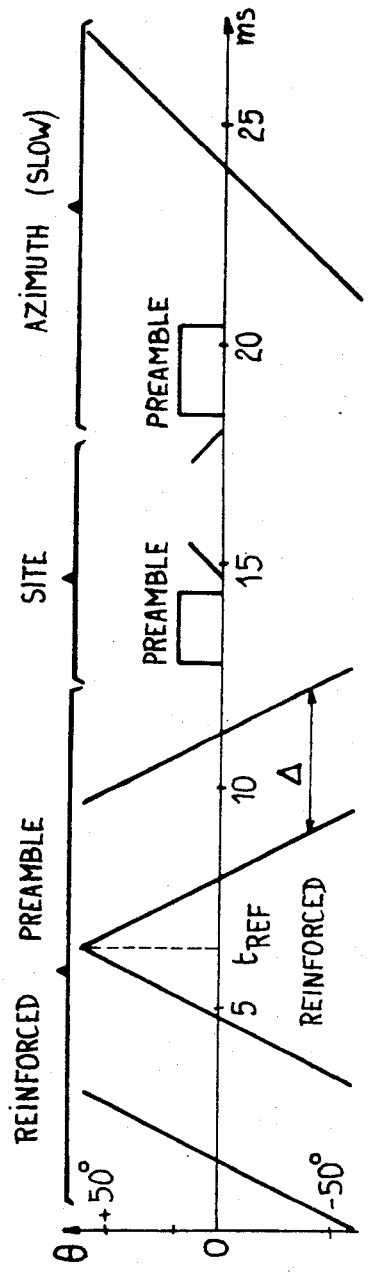

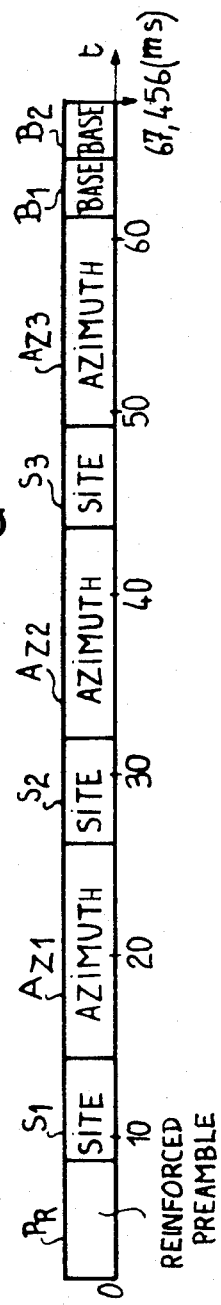
FIG_4-a
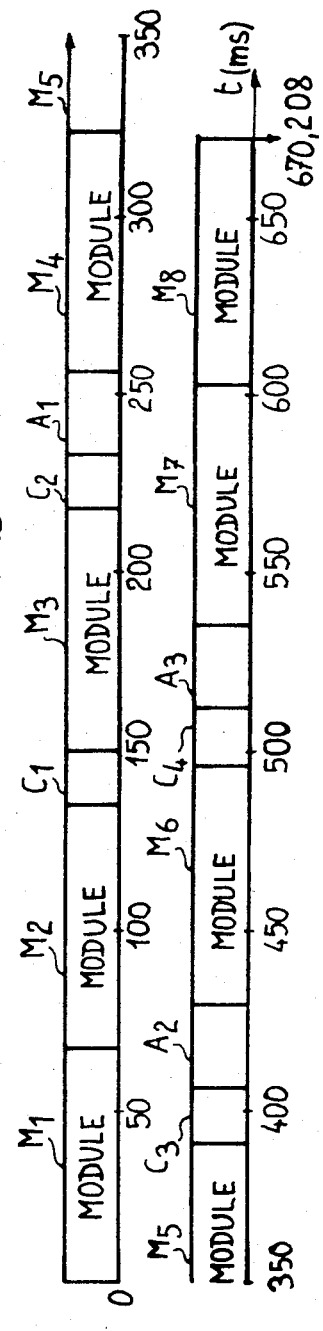
FIG_4-b

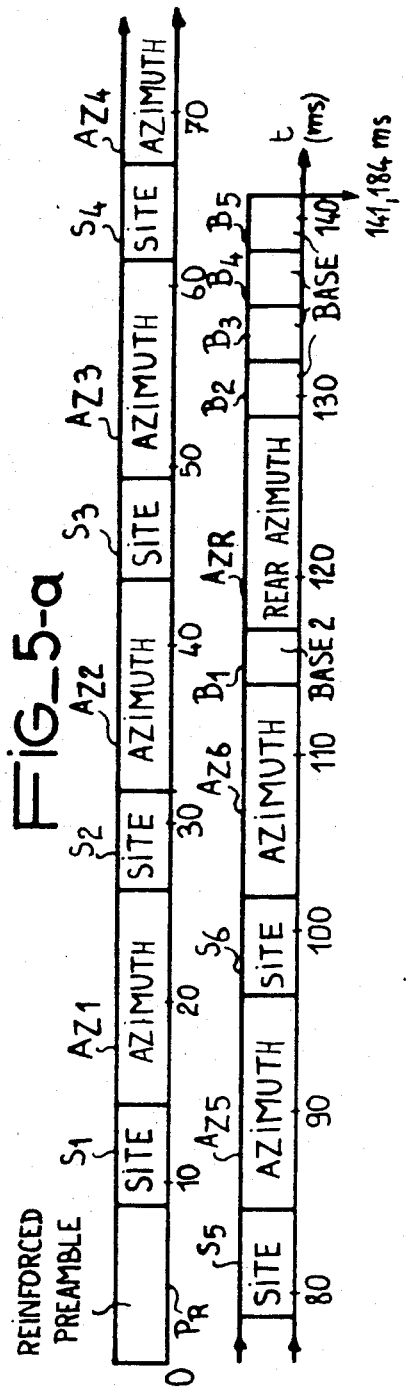

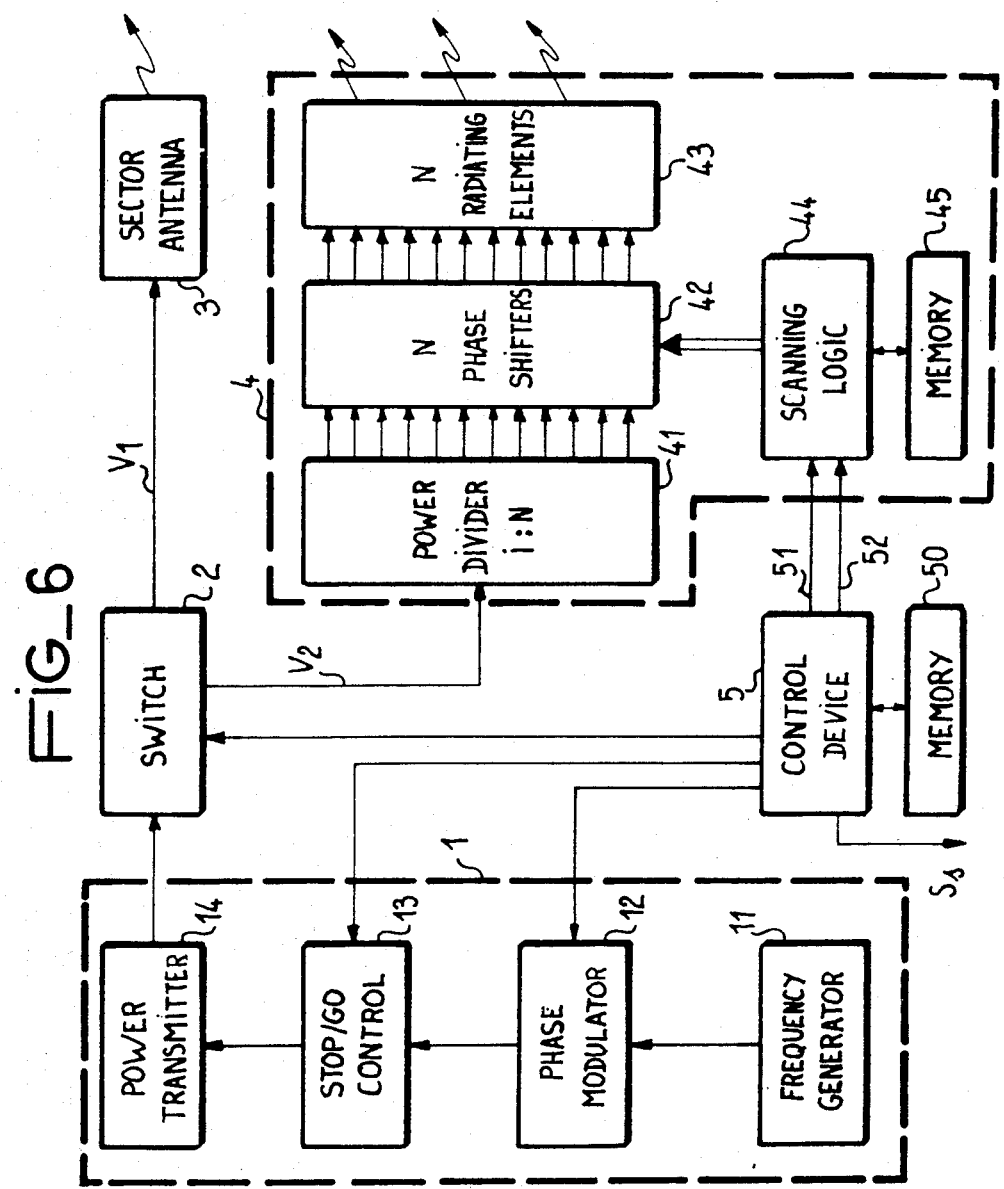
FIG_6

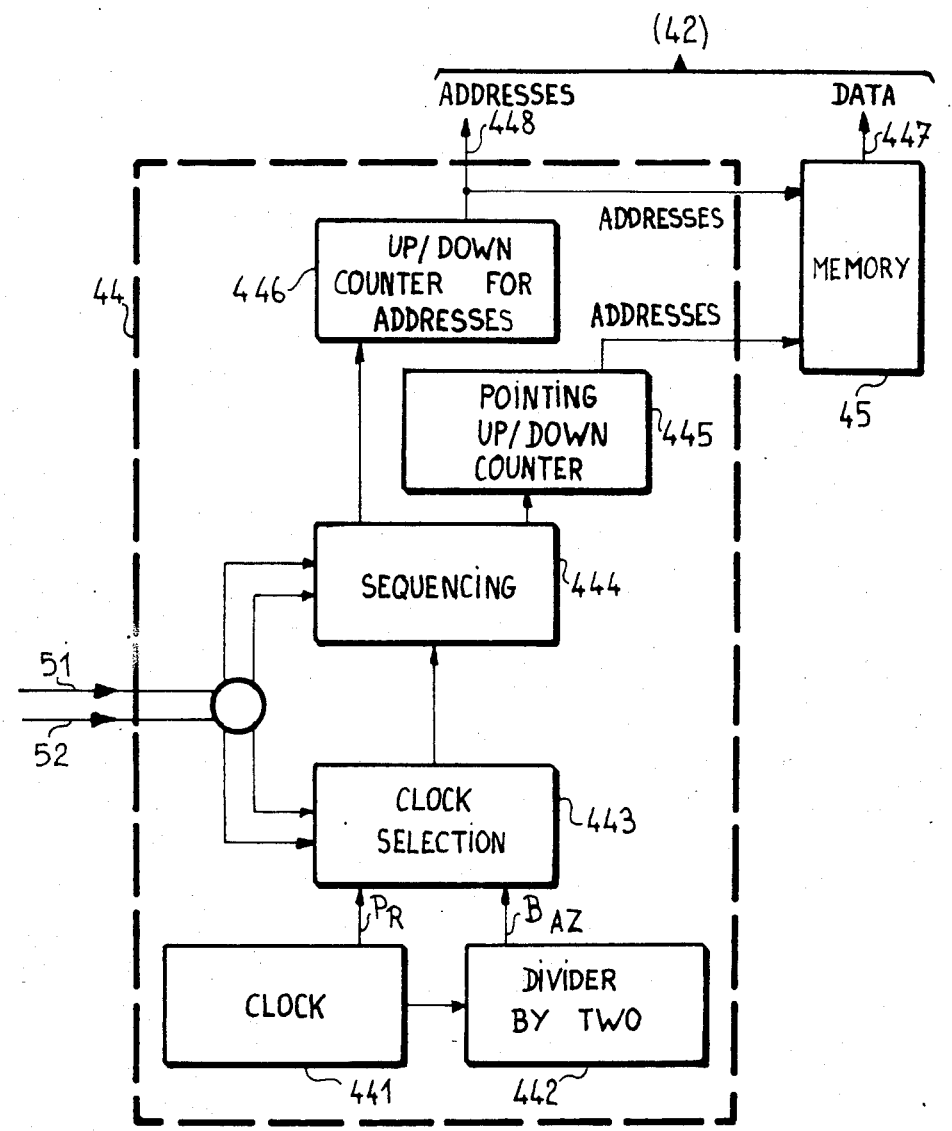
FIG_7

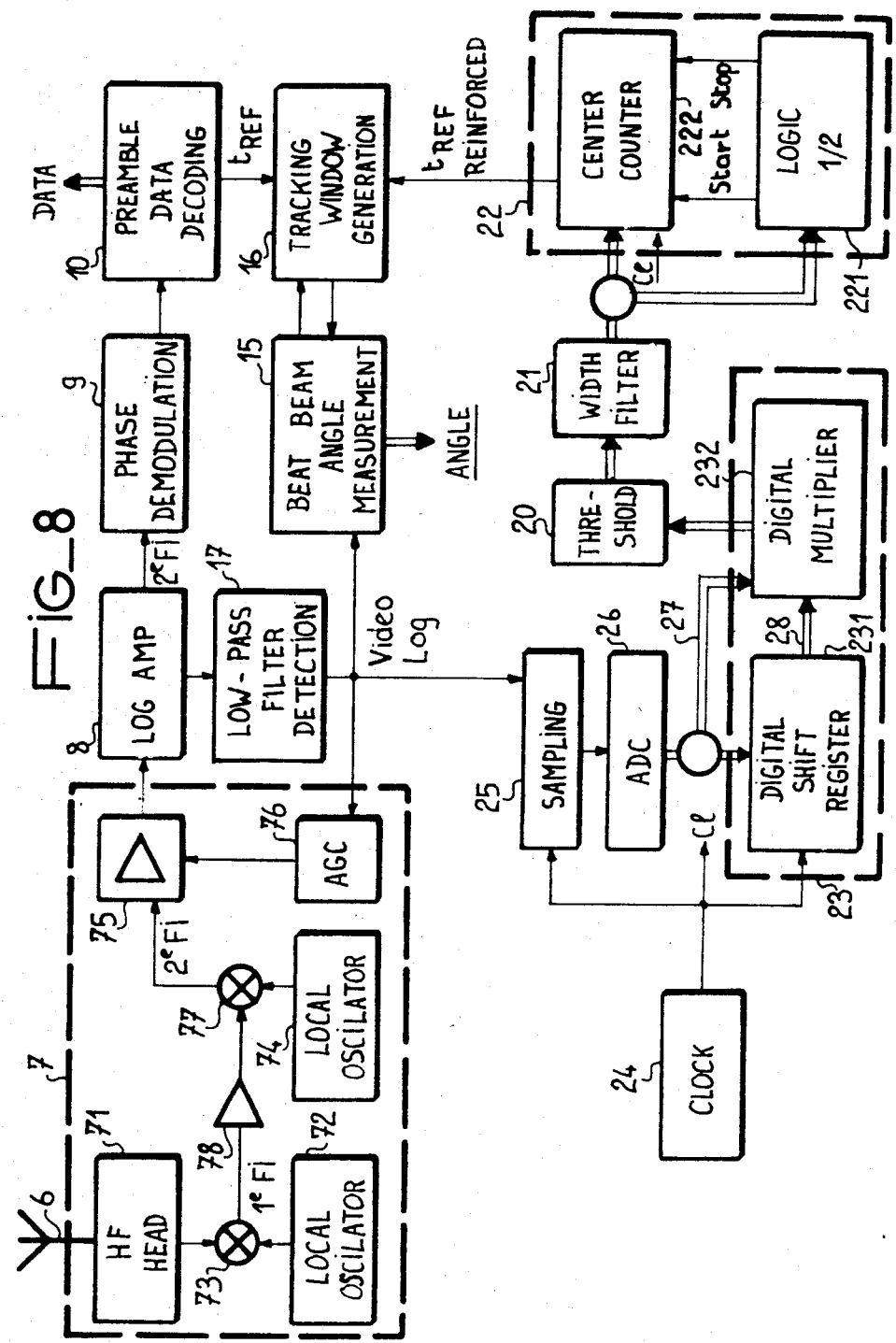

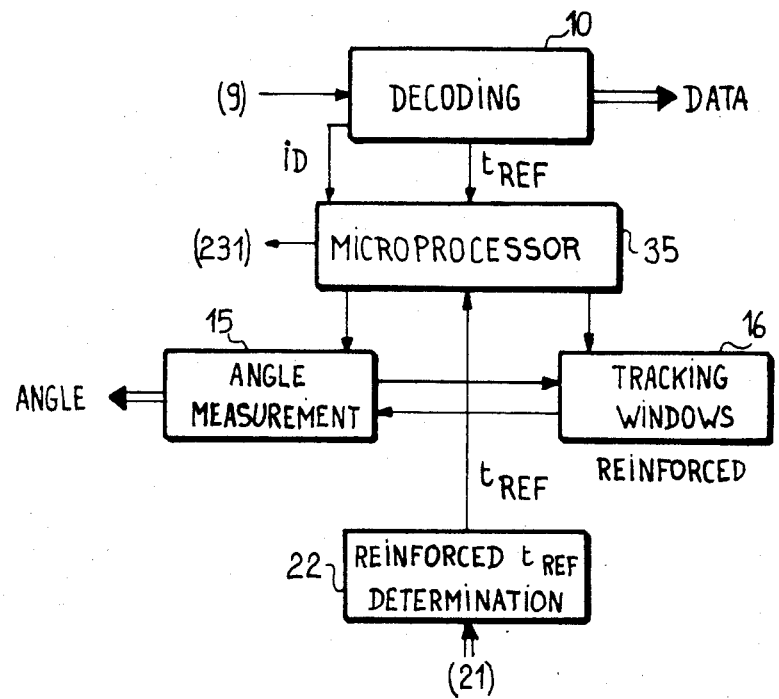
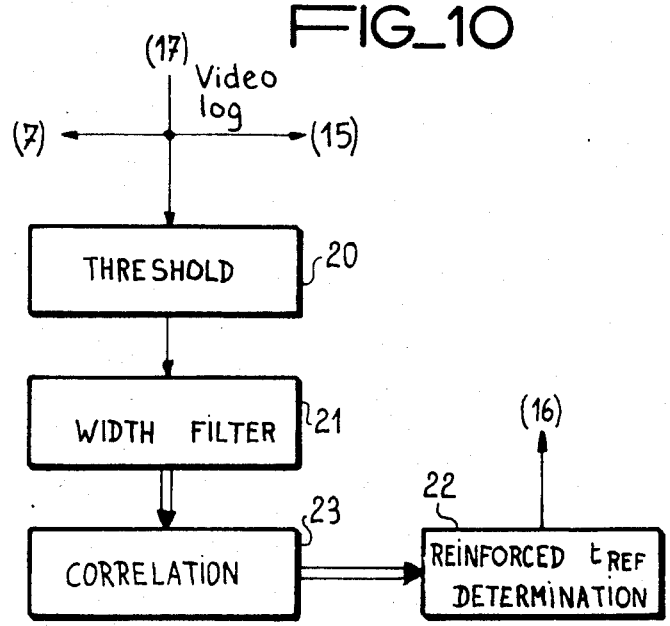

PROCESS FOR INCREASING THE RANGE AND PARTICULARLY THE PROTECTION AGAINST JAMMING OF AN MLS LANDING SYSTEM AND MEANS FOR PERFORMING THIS PROCESS

BACKGROUND OF THE INVENTION

The present invention relates to MLS-type landing systems and more specifically to a process for increasing the range and the protection against jamming of such a system, as well as to means for performing this process.

The microwave landing system or MLS makes it possible to assist an aircraft when landing by supplying it with different information called functions, such as its azimuth angle relative to the axis of the runway, its site angle relative to the horizontal and optionally other ancillary functions, such as e.g. the rear azimuth and data, comprising so-called basic data and so-called auxiliary data. These different information are permanently transmitted from the ground in time multiplexing on the same frequency in accordance with characteristics standardized by the International Civil Aviation Organisation (ICAO), appendix 10, paragraph 3.II and are decoded by each aircraft in question.

Each of the aforementioned functions is broken down into two successively transmitted parts. The first is a preamble, which serves to supply the aircraft with an identification of the following function. This preamble is transmitted by a sector antenna, i.e. a fixed antenna transmitting throughout the entire area or sector to be covered by the MLS. According to the ICAO standard, the preamble is in the form of a twelve bit word, more particularly comprising seven bits constituting an identification code designating in a biunivocal manner functions transmitted in two-state $(0,\pi)$ differential phase shift keying (DPSK) modulation. The actual function is then transmitted and in the case where this function is data, it is transmitted by the sector antenna in two-state DPSK modulation. When this function is an angular information, it is constituted by two pulses transmitted then with the aid of a scanning antenna, in accordance with the so-called time reference beating or beat beam described hereinafter with references to FIGS.1a, 1b and 2.

FIG.1a illustrates the azimuth angle encoding principle. In an azimuth station are transmitted two different radiations by two separate antennas which, for simplification purposes, are shown at the same point $A_Z$. Thus, starting from the latter, there is the transmission diagram of the preamble, designated $P_{AZ}$, transmitted by the sector antenna in the complete coverage zone of the MLS and which is represented in the drawing by an angle $\alpha$. Starting from $A_Z$, there is further the diagram of a flat, vertical beam $B_{AZ}$, called the beat beam, transmitted by an electronic scanning antenna. At constant speed, beam $B_{AZ}$ performs an outward scan and then, after a stop time, a return scan. This takes place in a scanning zone forming an angle $\beta_Z$ in the drawing, which can be equal to or less than the aforementioned coverage angle $\alpha$. In this drawing, $\beta_Z$ is shown smaller than $\alpha$. In addition, arrows $A_Z$ and $R_Z$ show the outward and return scan paths of beam $B_{AZ}$ in the scanning zone $\oplus_Z$. It is also possible to see an aircraft $A_V$, which is not e.g. correctly aligned with the runway axis ZZ.

In accordance with ICAO standards, angle $\oplus_Z$ is equal either to 20°, being broken down with respect to axis of runway ZZ into two semi-angles $-\sigma_M = +\sigma_M = 10°$, or 80° with $-\sigma_M = +\sigma_M = 40°$. The width or aperture of the beam $B_{AZ}$ is 1° to 4° in the plane of the drawing and 7.5° to 14° in the vertical plane.

FIG. 2 illustrates the operation of this device. The transmissions effected from the ground installations are shown as a function of time on an upper line. Thus, said installation transmits preamble $P_{AZ}$, followed by the outward scan time $A_Z$ of the beat beam $B_{AZ}$, then the return scan time $R_Z$ of the same beam. $F_{AZ}$ is the azimuth function finish time.

On the lower line of the diagram of FIG. 2 is shown the signals received on board the aircraft $A_V$, while ignoring the signal propagation time. These signals are firstly the preamble $P_{AZ}$ in principle identical to the transmitted preamble, and a pulse at each of the instants (output and return) where aircraft $A_V$ is illuminated by the beam $B_{AZ}$ from the ground antenna. These two pulses are respectively designated $A_{Z1}$ and $A_{Z2}$ and are separated by a time interval $\Delta t$.

Apart from its identification function, the preamble also has the function of supplying a time reference. The preamble has a part which precedes the identification code and uses a special code, called the BARKER code with five bits (11101) and the time reference (designated $t_{REF}$) is taken at the transition instant 0-1. This time reference makes it possible to decode the information in the aircraft receiver. In the case of an angular function, the center time $(t_o)$ between the outward and return scans has, according to the ICAO standards, a fixed time position relative to instant $t_{REF}$ $(t_o - t_{REF} = T_M)$ and this applies throughout the zone covered by the system. This facilitates decoding and makes it possible to validate the angle information. In the case of a data function, the instant $t_{REF}$ makes it possible to correctly decode the data bits.

The measurement in the aircraft receiver of the time which has elapsed between the peaks of pulses $A_{Z1}$ and $A_{Z2}$ supplies the value of the azimuth angle $\theta$ where the aircraft is located by means of the relation:

$$\theta = (T_o - \Delta t) \cdot \frac{V}{2}$$

in which:

$T_o$ is the time which has elapsed between two pulses when the receiver is located in azimuth 0° (on the axis of runway ZZ), this time being deduced from the ICAO standards of the MLS system;

V the ground antenna scanning speed, which is also standardized and which corresponds to an outward - return scan repetition rate of approximately 13 or 39 times per second, as a function of the type of MLS station.

FIG. 2 also shows two straight lines supplying the correspondence between the aircraft azimuth angle $\theta$ and the transmission and reception time of the various signals, the maximum scan angles $-\theta_M$ and $+\theta_M$ of the beam $B_{AZ}$ being illustrated.

In the same way in which this has been done in FIG. 1a, FIG. 1b shows the site transmission principle. FIG. 1b shows the site station S from which are transmitted two beams by two separate antennas, namely a sector antenna transmitting the site preamble $P_S$, whose diagram is shown in FIG. 1b, and the other transmitting a flat beat beam $B_S$ scanning the scanning zone of angle $\beta_S$, which is performed in the same way as for the azimuth beat beam $B_{AZ}$. According to ICAO standards, the angular width of the beat beam $B_S$ in the plane of the drawings is between 1° and 2°, while being 80° in the perpendicular plane.

In such an MLS station, the present invention proposes to overcome the problem of increasing the range of the system, without increasing the transmitting power, as well as that of possible jamming.

As can be gathered from the above description, the jamming of e.g. an angular function can take place either at the preamble by jamming the transmission of the sector antenna in question, or on the transmission of the beat beam supplying the actual angular information, or on both of them. The analysis of the respective transmission levels of the preamble and the beat beam shows that the gain of the scanning antenna exceeds that of the sector antenna by a theoretical value between 10 and 20 dB. In practice, the gains of the scanning antennas are not as high, due to the fact that the construction of such antennas is more complex and leads to higher losses, but still remains above that of a sector antenna. Moreover, the coverage, in the perpendicular direction to the scan, of the azimuth beat beam exceeds, according to ICAO standards, the width of the site beat beam, so that the scanning antenna used for the azimuth function has a higher gain. Thus, the part of the MLS signal which is most sensitive to jamming, because it corresponds to the lowest level, is the preamble radiated by the sector antenna.

In order to reduce the vunerabiity of the MLS signal to jamming, it is known to increase the transmitting power of the preamble. However, this function suffers from the following disadvantages. Its cost: due to the power and frequency levels used at present, the sector antenna transmitter is constructed with the aid of transistors and any significant increase in this transmission power would make it necessary to use more complicated and costly travelling wave tubes. The reduction in the discretion of the system: an increase in the transmission power increases the range and consequently the vulnerability to possible countermeasures. Its very relative efficiency: a corresponding increase in the power of the jammer would lead to the same problem again.

It is also known to reinforce the preamble with the aid of a scanning antenna successively pointed on the different angles of the coverage. This system is more particularly described in the THOMSON-CSF French Patent No. 2 519 430. However, in this system, the receiver only decodes the reinforced preambles when the scanning antenna is pointed on it, while in the intervals it is not guided, which is a disadvantage.

Moreover, in the absence of jamming, the range of an MLS station is defined by the range of the preamble radiated by the sector antenna, to the extent that it is the lowest signal. Thus, a reinforcement of the preamble makes it possible to increase the range.

SUMMARY OF THE INVENTION

The object of the present invention is a process for reinforcing the preamble in order to increase the range of the system and to protect it against jamming, while not suffering from the aforementioned disadvantages.

It consists of transmitting a supplementary preamble, for each function or group of functions, by means of one of the scanning antennas used by the system, preferably the azimuth antenna, this taking place during the time when the latter is not conventionally used. Thus, the supplementary preamble transmitted can be received and used by receivers especially equipped for this purpose and is transparent for conventional receivers.

According to the invention, there is provided a process for the range of an MLS system and comprising a plurality of successive steps for the transmission of an MLS function further comprising at least one step for transmitting a supplementary preamble, called reinforced preamble, said reinforced preamble comprising at least two outward scan steps and one return scan step, or at least one outward scan step and two return scan steps the time interval ($\Delta$) between two scans of the same type constituting an identification information for at least the first function following said reinforced preamble, and the center instant (reinforced $t_{REF}$) of the sequence constituted by an outward scan step followed by a return scan step constitutes a time reference information for at least the first function following said reinforced preamble.

The invention also relates to means for performing this process on transmission and on reception.

BRIEF DESCRIPTION OF THE DRAWINGS

The invention is described in greater detail hereinafter relative to non-limitative embodiments and with reference to the attached drawings, apart from the already described FIGS. 1a, 1b and 2;

FIGS. 3 a and b show two embodiments of the supplementary preamble used in the process according to the invention;

FIGS. 4a and b illustrate a first mode of sequencing the supplementary preamble and the MLS functions in the process according to the invention;

FIGS. 5a and b illustrate a second mode of sequencing the supplementary preamble and the MLS functions in the process according to the invention;

FIG. 6 shows an embodiment of the device for performing the invention in the ground MLS station;

FIG. 7 shows in greater detail the scanning logic of FIG. 6;

FIG. 8 shows an embodiment of the device for performing the invention on board an aircraft;

FIG. 9 presents a first variant of FIG. 8; and

FIG. 10 presents a second variant of FIG. 8.

In the various drawings, the same references relate to the same elements.

DETAILED DESCRIPTION OF THE INVENTION

Thus, according to the process of the invention, for each MLS function or for a group of such functions, there is transmitted a supplementary or reinforced preamble, which must be transmitted by a scanning antenna and preferably by that used for the azimuth function because, as stated hereinbefore, its gain is higher than that of the other antennas. This reinforced preamble must fulfill the two conventional functions of the preamble, namely the identification of the function or functions which follow and the time reference (instant called reinforced $t_{REF}$). According to the invention, the reinforced preamble is transmitted before the normal preamble of the function or functions in question by the azimuth scanning antenna, when the latter is not being normally used. This preamble is constituted by several scans and at least three outward or return scans are broken down into two outward and one return or one outward and two return scans, in order to obtain the two aforementioned functions. Thus, an aircraft located at any random point of the coverage of the MLS receives a message consisting of several pulses, which can be used as a reinforced preamble if the normal preamble is jammed. As the delay ($\Delta$) between two outward or return scans is constant, no matter what the position of the aircraft is in the coverage, said delay can be used for identifying the function or group of functions in question. Thus, an outward scan associated with a return scan supplies the sought time reference (reinforced $t_{REF}$), which is taken as being the center of a pair of pulses, due to the fact that the latter has a fixed position no matter what the position of the aircraft in the coverage of the system.

FIG. 3a shows an embodiment of the supplementary preamble according to the invention. It shows, as a function of time, the transmission angle $\theta$ of the beat beam and of the sector antenna.

The azimuth scanning antenna firstly transmits the reinforced preamble. It consists of four scans illustrated by continuous lines, successively two outward and two return scans which, in this embodiment, are realized at double the angular scanning speed compared with that for the azimuth function, so as to prevent the reinforced preamble lasting too long. Both the two outward scans and the two return scans are separated by the identification time interval $\Delta$.

The reinforced preamble is followed by the standard site function with its preamble $P_S$, its outward scan $A_S$ and its return scan $R_S$, separated by the standard time interval. The site function is in turn followed by the azimuth function which, in the same way, has its preamble $P_{AZ}$, its outward scan $A_{AZ}$ and its return scan $R_{AZ}$. For example, these two functions can be followed by another of the aforementioned functions, which conventionally starts with its preamble P.

It is apparent from FIG. 3a, that the reinforced preamble is common to three functions and does not modify the normal performance thereof. Thus, a transmission according to the invention can be normally decoded by a standard ICAO receiver.

FIG. 3a shows the numerical data for angles and times as standardized by the ICAO, with a so-called fast azimuth function, whose turnover rate is approximately 39 Hz, using a scanning speed of 50 $\mu$s/degree on $\pm 40°$. The reinforced preamble is then characterized by a double scanning speed, i.e. 25 $\mu$s/degree. The deviation $\Delta$ between two outward scans and two return scans is 2.176 ms and has the characteristics of the following group of functions. The total duration of the reinforced preamble is then 8.704 ms.

The advantage of this variant consisting of using a reinforced preamble with four scans is that the detection of a pair of pulses on board the aircraft is more reliable with respect to interference (clutter or jamming) than that of a single pulse. In order to compensate the lengthening of the preamble resulting from this, a scanning speed double the scanning speed used for the azimuth function is chosen.

FIG. 3b shows another embodiment of the reinforced preamble according to the invention which is also formed from four scans, but which differs from the aforementioned preamble as a result of the value chosen for $\Delta$, which can e.g. be 3.2 ms in the case where a so-called slow azimuth function is used, i.e. a scan on $\pm 60°$ at the same speed (50 $\mu$s/degree) with a turnover rate of approximately 13 Hz, in accordance with ICAO standards. The total duration of the reinforced preamble is in this case 12.8 ms.

Thus, FIGS. 3a and b show a reinforced preamble common to the site and azimuth functions, possibly together with a third function.

According to a not shown variant of the invention, the azimuth scanning antenna transmits a reinforced preamble before each azimuth or site function. It is then necessary to define a specific deviation $\Delta$ for each function in order to permit its identification. The advantage of this variant is increased reinforcement against jamming. Its disadvantage is that it takes longer and consequently reduces the information rate.

According to another not shown variant of the invention, the minimum number of scans is used for the reinforced preamble, i.e. 3 and preferably in the order outward—outward—return. The identification is then supplied by the deviation $\Delta$ between the first two outward—outward pulses and the time reference by the center between the two last outward—return pulses. Symmetrical considerations to the first apply, said triple preamble being more vulnerable to jamming and multipaths than the first because it uses a single return pulse, but it is less disadvantageous from the time standpoint.

Another not shown variant of the invention consists of using a reinforced preamble with six scans, e.g. according to one of the three following sequences with A=outward, R=return:

A A R R A A
A R A R A R
A A A R R R

Another variant of the invention consists of using a reinforced preamble with eight scans, according to e.g. one of the following sequences (with the same notation):

A A R R A A R R
A A A A R R R R
A A A R R R A R

In the case where a reinforced preamble with more than three pulses is used, it is possible to carry out a correlation on the complete method constituted by the reinforced preamble, which makes it possible to further reduce the vulnerability of the reinforced preamble in a ratio which is a function of the number of pulses on which the correlation is performed.

The scanning speed used in the reinforced preamble is constant throughout the preamble, but this is not necessarily the case between individual MLS stations. According to ICAO standards, the width of the azimuth beat beam can have several different values according to the installations, namely 1, 2, 3 or 4°. It is possible to use the same scanning speed for the reinforced preamble, no matter what the width of the azimuth lobe. This has the disadvantage of complicating the receiver on board the aircraft, the pulses received by the latter then having a variable duration as a function of the width of the azimuth lobe, in accordance with the following expression:

$$\tau = 25 \cdot \theta,$$

$\tau$ being the duration expressed in microseconds at $-3$ dB of the pulses received and $\theta$ the width in degrees at $-3$ dB of the azimuth lobe. In order to avoid this variation, it is possible to determine the speed of the scan used for the reinforced preamble as a function of the width of the azimuth lobe according to the following correspondence:

| Azimuth lobe width at −3 dB | Preamble scanning speed |
| --- | --- |
| 1° | 25 μs/degree |
| 2° | 12.5 μs/degree |
| 3° | 6.25 μs/degree |
| 4° | 3.125 μs/degree |

In exemplified manner, FIG. 3a shows in broken line form a reinforced preamble effected at a speed of 3.125 μs/degree corresponding to a 4 degree lobe.

FIG. 4a shows in exemplified manner a basic module used in the process according to the invention, the term "module" being understood to mean a particular realization of the sequencing of several functions following a reinforced preamble.

This module comprises a reinforced preamble $P_R$, such as e.g. described in 3a or b, followed by a first site function $S_1$, then a first fast azimuth function $A_{Z1}$, then a second site function $S_2$, a second fast azimuth function $A_{Z2}$, a third site function $S_3$, a third fast azimuth function $A_{Z3}$, a first basic data word $B_1$ and finally a second basic data word $B_2$. In the case of a reinforced preamble with a total duration of 8.704 ms and the ICAO standardized duration for each of the following functions (site 5.632 ms, fast azimuth 11.904 ms, basic data word 3.072 ms), a total duration of the module of 67.456 ms is obtained.

It should be noted that the rear azimuth function is not included in the module of FIG. 4a which means that it is not reinforced against jamming. It is in fact a less important function than the azimuth and site functions. However, it can be included in a module, as is shown by FIG. 5a.

FIG. 4b defines a complete time sequence example according to the invention, with the repetition of the module of FIG. 4a interspersed with supplementary informations, such as auxiliary data or rear azimuth function, the latter being preceded by a basic data carrying number 2 in the ICAO nomenclature and as illustrated by the following table. The basic data appearing in the module ($B_1$, $B_2$) are then words carrying a number other than 2 in the ICAO nomenclature. The times indicated are either the time chosen for the module of FIG. 4, or the ICAO standardized time. The total time for the sequence obtained is 670.208 ms.

| FUNCTION | TIME (ms) |
| --- | --- |
| Module ($M_1$) | 67.456 |
| Module ($M_2$) | 67.456 |
| Basic word No. 2 + rear azimuth ($C_1$) | 14.976 |
| Module ($M_3$) | 67.456 |
| Basic word No. 2 + rear azimuth ($C_2$) | 14.976 |
| 4 auxiliary data words ($A_1$) | 4 × 5.888 |
| Module ($M_4$) | 67.456 |
| Module ($M_5$) | 67.456 |
| Basic word No. 2 + rear azimuth ($C_3$) | 14.976 |
| 4 auxiliary data words ($A_2$) | 4 × 5.888 |
| Module ($M_6$) | 67.456 |
| Basic word No. 2 + rear azimuth ($C_4$) | 14.976 |
| 4 auxiliary data words ($A_3$) | 4 × 5.888 |
| Module ($M_7$) | 67.456 |
| Module ($M_8$) | 67.456 |
| TOTAL | 670.208 ms |

The repetition rates corresponding to the sequence of FIG. 4b are as follows:
fast azimuth +35.81 Hz
site: 35.81 Hz
rear azimuth: 5.97 Hz
basic word No. 2: 5.97 Hz
basic data other than word No. 2: 23.87 words/s
auxiliary data: 17.9 words/s.

It can be seen that the azimuth and site information rate is slightly below the ICAO standard (39±1.5 Hz). However, such a frequency is very adequate, bearing in mind the response time of the automatic pilots in existing aircraft. Moreover, this slight frequency drop has no practical effect on the operation of an ICAO receiver.

Moreover, it is possible to see in the performance of the sequence of FIG. 4b, an irregularity in the repetition period of a given function, which is desirable for the purpose of preventing possible interference by synchronous reflections (e.g. reflections on propeller blades).

FIG. 5a shows an embodiment of the module used in the process according to the invention. This module is longer than that of FIG. 4a, i.e. a reinforced preamble is followed by more functions, namely the six site functions, six fast azimuth functions, one rear azimuth function and five basic data words. More specifically, the reinforced preamble $P_R$ is successively followed by six pairs of site functions ($S_1$–$S_4$) and fast azimuth functions ($A_{Z1}$–$A_{Z6}$), basic data word No. 2 ($B_1$), a rear azimuth function $A_{ZR}$ and finally four basic data words other than No. 2 ($B_2$–$B_5$).

Thus, the turnover rate of the site and azimuth functions is greater than in the case of FIG. 4. Moreover, with the same reinforced preamble as hereinbefore, it is possible to obtain a total duration of the module of 141.184 ms.

FIG. 5b defines in the same way as FIG. 4b, a sequence involving the module of FIG. 5a. This sequence successively has a first module $M_1$, two auxiliary data words ($A_1$), a second module $M_2$, six auxiliary data words ($A_2$), a third module $M_3$, four auxiliary data words ($A_3$) and finally to finish the sequence, a fourth module $M_4$.

This sequence has a total duration of 635.392 ms, which gives azimuth and site information repetition rates of 37.8 Hz, which is within the standard ICAO range. Its disadvantage compared with the embodiment of FIG. 4 is obviously that it is more vulnerable to jamming.

Modules and sequences differing from those of FIGS. 4 and 5 can obviously be defined if it is wished to increase the protection against the jamming of certain functions or improve certain characteristics, e.g. improve the basic or auxiliary data rate, introduction of the flare guidance function, or the 360° azimuth.

The preceding description has given a number of variants for reinforced preambles which, when chosen, are used by the MLS station without any time modification. In order to minimize the risk of jamming, because the reinforced preamble is liable to be identified in the long run, it is possible according to a not shown variant of the invention to vary the definition of the reinforced preamble in time, in accordance with a group of predefined codes, the code being periodically changed in synchronous manner at the ground transmitter and at the aircraft receiver, in the same way as for the generally used friend—enemy coding system. The variation of the code can relate to the variation of the deviation Δ separating the pulse pairs. For example, it is possible to find a group of 16 different codes with 64 μs steps: in fast azimuth $\Delta_i=2176+i.64$ μs, or in slow azimuth $\Delta_i=3200+i.64$ μs, i varying between 0 and 15. In the case of a reinforced preamble using six scans as described hereinbefore, the code variation can be brought about by a variation in the succession of the outward and return scans. In the case of 6, 8 or more scans, it is possible to vary the successive deviation $\Delta$ between pulses, which are not necessarily constant. In order to vary the deviation $\Delta$ between two pulses, it is also possible to introduce a dead time between two scans, which makes it possible to retain the apparent duration of the pulses (as seen by the aircraft receiver). It is also possible to vary the scanning speed, in order to increase or decrease the duration of scanning. The result is a modification to the apparent duration of the pulses (as seen by the aircraft receiver.) for a given width of the azimuth lobe. Coding can then take place on the width of the received pulse, or on the variation between pulses, or on both of these.

According to another not shown variant, it is possible to transmit the reinforced preamble by the site scanning antenna. Although this antenna generally has less gain than the azimuth scanning antenna, it still has more gain than the sector antenna, so that its use reinforces the preamble.

According to another variant, it is also possible to reinforce, with respect to jamming, the basic data words or auxiliary data words which are normally transmitted by the sector antenna in the same way as the preamble. Thus, the said data are vulnerable to jamming in the same way as the preamble. In the case where it is wished to reinforce the transmission of certain data considered to be essential, it is possible to transmit them in the same way as the reinforced preamble with the aid of an azimuth beat beam, but at a reduced rate. These data are then conventionally transmitted (DPSK modulation) at different instants by the azimuth scanning antenna pointed in one of the directions of the coverage and then, during the following transmission of the same data word, on an adjacent direction, etc. Thus, said reinforced data are only received at a very low rate in a given direction. According to a second method, a scanning antenna is used in order to make it carry out a succession of outward or return scans, preceded by an outward and return scan, with a spacing code. Two different spacing values respectively correspond to bits 0 and 1, so that the aircraft receives a pulse train representing the data word.

FIG. 6 shows an embodiment of the device for performing the process of the invention on the ground. This device essentially comprises a transmitter 1, two antennas, namely a sector antenna 3 and a scanning antenna 4, and the various control circuits 2, 5.

Transmitter 1 has in cascade a frequency generator 11, e.g. constituted by a frequency synthesizer supplying a wave close to 5 GHz according to the ICAO standard (it is pointed out that according to this standard one frequency from among 200 previously defined frequencies close to 5 GHz is allocated to each MLS station), a phase modulator 12 performing a two-state $(0,\pi)$ DPSK phase modulation making it possible to transmit the preamble and the data under the control of a logic control device 5, such as a microprocessor, a stop/go control device 13 also controlled by microprocessor 5, and a power transmitter 14 constructed on the basis of a tube or transistors according to the power required, which is normally approximately 20 W and consequently usually transistors are used.

Transmitter 1 supplies a signal, via a switch 2, either on a channel $V_1$ to the sector antenna 3 for the transmission of the preamble and the basic or auxiliary data, or on a channel $V_2$ to scanning antenna 4.

The latter is broken down into a power divider or distributor 41, which divides the power received from switch 2 into N in order to supply N digital phase shifters (block 42), which supply N radiating elements (block 43). The values of the phase shifts introduced by phase shifters 42 are controlled by a logic scanning circuit 44, in order to carry out an electronic scan on the basis of static radiating elements in known manner. It is pointed out that if it is wished to transmit a beam (of wavelength $\lambda$) forming an angle $\theta$ with the normal to the alignment of radiating elements 43, the phase shift $\Delta\alpha\theta_i$ introduced by a phase shifter of rank $i(1\leq i\leq N)$ is given by:

$$\Delta\phi_{\theta,i} = 2\pi i \cdot \frac{d}{\lambda} \cdot \sin\theta$$

in which d is the distance between two successive radiating elements. The logic scanning circuit 44 is generally a wired circuit separate from microprocessor 5 (although this is not absolutely necessary) due to the speed required. On receiving the starting instruction from microprocessor 5, circuit 44 effects the control of phase shifters 42, so as to ensure the desired scanning by successive fast pointings of the antenna lobe. The positions of the phase shifters 42 for each pointing are generally stored (memory 45) in PROM-type memories. The number N of phase shifters 42 is normally approximately 20 to 100.

Thus, the complete device is controlled by microprocessor 5 and its memory 50 (e.g. of the PROM type), connected to transmitter 1, switch 2 and scanning antenna 4 via the logic scanning circuit 44. Microprocessor 5 supplies the scanning circuit on the one hand with the scan start time for the site or azimuth functions (arrow 51) and on the other hand the scan start time for effecting the reinforced preamble (arrow 52). The sequence according to the invention and as shown e.g. in FIGS. 4b or 5b is contained in memory 50 of microprocessor 5. In the case where the reinforced preamble used a different scanning speed (double in the above example) of that of the angular function, the clock frequency used by the logic scanning circuit 44 is modified under the control 52 of microprocessor 5.

The ground system generally comprises two stations like that described in FIG. 6, one for the site function and the other for the azimuth function. Thus, synchronization is required and is e.g. supplied by the microprocessor 5 of the azimuth station, of arrow $S_s$ in FIG. 6.

More specifically, and in accordance with an embodiment, in microprocessor 5 is defined "status word" of the station, each bit of this word representing a control. In the aforementioned embodiment, said word has at least six bits respectively controlling modulator 12, control 13, switch 2, scanning logic 44 (two bits) and site synchronization $S_s$.

The real time generation of a sequence, such as those of FIGS. 4b or 5b, amounts to the real time production of the status word, which then carries out the different controls.

For this purpose, the succession of status words corresponding to the desired sequence is placed in a table of memory 50. For the timing of a suitable clock (here 64 μs), the microprocessor 5 will seek the successive status words and will sppply them to a not shown interface of the PIA (prallel interface adapter) type for example, which controls the various blocks.

It should be noted that as a result of the repetition of certain of these functions in the same sequence, it is possible to reduce the memory space necessary by a hierarchic arrangement thereof. The same number of tables as there are functions is then stored and a main table defines the sequence by calling on the successive functions.

FIG. 7 shows in greater detail an embodiment of the control blocks 44, 45 of the scanning antenna. It is pointed out that the scanning logic controls the phase shifters 42, in such a way as to perform a succession of adjacent pointings of the lobe, thus simulating a quasi-continuous scan.

For example, the phase shifters 42 are four bit digital phase shifters and in this case each of them makes it possible to phase shift a wave between 0° and 360° with 22.5° steps. The positions of the N phase shifters for the successive pointings (usual step 0.1° to 0.2°) are calculated beforehand and stored (memory 45) in the form of four bit words. Each of the N phase shifters is identified by an address and the scanning logic 44 serves to successively supply the values of the phase shifts (data bus 447) of the respective addresses (address bus 448) to the block of phase shifters 42. Therefore, logic block 44 comprises:

a clock 441 and a divider by two 442 of the signal supplied by said clock, corresponding respectively to the reinforced preamble PR and to the azimuth scan $B_{AZ}$;

a clock selection logic device 443 controlled (controls 51 and 52) by microprocessor 5;

a logic sequencing circuit 444, controlling the release and the operating mode of up/down counters 445, 446, also controlled by microprocessor 5;

an up/down counter 445 for the pointing of the lobe and at each instant it supplies the lobe pointing value used by memory 45 as the address (partial, see hereinafter) of a data supplied by it (bus 447) to phase shifters 52;

an up/down counter 446 for the addresses of the phase shifters and for a given pointing of the lobe (information supplied by up/down counter 445), it permits the successive addressing of the N phase shifters, so that its frequency is N times higher than that of counter 445.

FIG. 8 shows an embodiment of the device for performing the process according to the invention on board an aircraft.

It comprises a receiving antenna 6 for the signals transmitted by the ground station connected to the conventional double frequency change superheterodyne receiver 7. The latter has an HF head 71 receiving the signal from antenna 6, which filters and amplifies it to supply it to a mixer 73. The latter also receives a given frequency from a first local oscillator 72 enabling it to effect a first frequency change of the signal received. The signal from mixer 73, designated 1° FI, is transmitted after amplification 78 to a second mixer 77 which, also receiving a signal transmitted by a second local oscillator 74, performs a second frequency change (signal designated 2° FI) Signal 2° FI then passes into an amplifier chain 75, controlled by an automatic gain control device 76. Thus, receiver 7 supplies the output signal 2° FI at an intermediate frequency, generally chosen as 10.7 MHz, to a logarithmic amplifier 8. This amplifier 8 supplies an output at saturated intermediate frequency in order to permit the demoduation of information coded in DPSK by means of a phase demodulator 9. It further supplies a second output which supplies in turn, after detection and low-pass filtering (block 17), a "video log" signal. Said video log signal is supplied to a device 5 for measuring the angle on the basis of the beat beam. The video log signal is also supplied to the automatic gain control device 76. The signal demodulated by demodulator 9 is supplied to a decoding device 10, which on the one hand serves to supply data (basic data and auxiliary data) and on the other hand to decode the preambles in order to supply the identification of the function and the time referenc $t_{REF}$) for the generation by a device 16 of symmetrical tracking windows on the beat beam. The latter operates in reciprocal relationship with the angle measurement device 15. It is pointed out that assembly 15-16 operates in the following way:

during a first acquisition phase, it carries out an investigation of the maxima of the pulses received;

in a second phase, reception windows are produced, which are symmetrical with respect to time $t_o$ (FIG. 2) determined on the basis of time $t_{REF}$ given by the preamble: $t_o = t_{REF} + T_M$ with $T_M$ the duration fixed by ICAO standards for each angular function;

in a third phase measurement of the time between the pulses received in the windows, corresponding respectively to an outward scan and a return scan takes place, and the position of the windows is corrected on the basis of the time measurement performed, the sought angle (azimuth or site) being deduced therefrom.

Elements 6 to 10 and 15 to 17 are more particularly described in a FAA-DOT-U.S.A. document proposing to the ICAO a type TRSB MLS (TRSB=time reference scanning beam.) (published December 75, Vol. I, paragraph 2.4.2).

The video log signal supplied by device 17 is also addressed to an analog-digital converter 26 following time sampling (block 25) with the timing of a block 24, which supplies a signal CP. For example, a sampling period of approximately 4 or 5 μs is suitable. The digital signal on N bits is transmitted to a device 23 for recognizing and validating the reinforced preamble, e.g. by correlation. It comprises a digital shift register 231, which delays the signal by a value Δ, on the control of the clock signal Cl, and a digital multiplying circuit 232, which forms in real time the product of the undelayed sampled digital signals (input 27 on N bits coming from device 26) as well as the delayed sampled digital signals (input 28 on N bits coming from register 231). Thus, at the output of multiplier 232 there is available a signal having a maximum during the reception of a pair of pulses separated by the sought interval Δ. This signal is transmitted (still on N bits) to a logic threshold circuit 20, which only retains the correlation peaks above a predetermined threshold. This threshold circuit is followed by a width discriminating circuit 21, also called a width filter, which eliminates the responses not having the expected width. This filter is useful in the case where the reinforced preamble consists of received pulses of constant width. The signal at the output of the width filter, still on n bits, is transmitted to a circuit 22, whose function is to determine the reinforced instant $t_{REF}$. It comprises a counter 222, receiving the pulses supplied by width filter 21 and the clock signal Cl, and a logic circuit 221, which also receives the same pulses and makes it possible to distinguish the first from the second, in order to start or stop the counter 222. This circuit 221 can be e.g. a divider by two or a logic flip-flop.

The description above makes it possible to decode and process a single angular function. As the MLS sequence consists of an alternation of several angular functions identified by their preamble, it is necessary in order to process the same to duplicate or triplicate certain of the circuits of FIG. 8, particularly device 16 for generating the tracking windows and the angular measurement performed by device 15.

FIG. 9 shows a variant of FIG. 8, in which a microprocessor makes it unnecessary to duplicate the circuits. To this end, device 10 which decodes the preamble (and the data) supplies the reference instant ($t_{REF}$) and identification instant (ID) of the azimuth function or site function to a microprocessor 35, which supplies the necessary information both to the tracking window generation device 16 and to the angle measurement device 15. In addition, the device 22 for determining the reinforced instant $t_{REF}$ now supplies its information to microprocessor 35 and no longer directly to device 16. Finally, microprocessor 35 also controls the shift register 231, in order to adapt the delay to the different functions. In a variant, the duration $\Delta$ of the delay given by register 231 can be manually displayed on the latter.

Thus, the different processing parameters (angle, voltage, CAG, etc) corresponding to the different functions can be stored and then called up as a function of the identification information decoded in the preamble.

FIG. 10 shows another variant of the aircraft-borne receiver. In this variant, the log video from device 17 is no longer transmitted to a sampler and is instead directly passed to the threshold device 20, which converts it into a two-state logic signal. This signal is transmitted to the width filter 21 and then to the correlation circuit 23, which transmits the signal produced by it to the circuit 22 for determining the reinforced $t_{REF}$. This solution has the advantage of making it possible to eliminate the sampler and analog-digital converter on the one hand and on the other hand simplifies the correlation circuit. Thus, the latter as hereinbefore, uses a digital shift register, but it now functions on a single bit instead of n bits and the multiplication circuit carrying out the multiplication between the delayed signal and the undelayed signal now only has to multiply two digits of a single bit, which also leads to a considerable simplification thereof.

However, this solution has increased jamming sensitivity, due to the fact that the selection of the pulses by the threshold circuit and the width filtering are carried out before correlation instead of after it, as in FIG. 8.

According to another variant of FIG. 8, which is not shown, the correlation circuit 23 is replaced by a counter, which measures the deviation between two successive pulses, which are rejected if it is not the desired deviation $\Delta$. This variant has the advantage of being simpler, but has difficulties with regard to the initialization of the counting and the disadvantage of having an overall greater sensitivity to jamming.

What is claimed is:

1. A process for increasing the range of an MLS for assisting the landing of an aircraft, the process including a plurality of successive steps for transmitting an MLS function, the MLS function including information for assisting the aircraft to land, the process comprising:

transmitting at least once a supplementary reinforced preamble, the reinforced preamble having at least two outward scans and one return scan or at least one outward scan and two return scans;

identifying the time interval between two scans of the same type, the time interval being representative of identification data for at least the first function following the reinforced preamble; and identifying the center instant of a scan sequence of the reinforced preamble, the scan sequence having an outward scan followed by a return scan, wherein the center instant is representative of the time reference data for at least the first function following the reinforced preamble.

2. A processing according to claim 1, wherein the transmitting step comprises the transmitting of a reinforced preamble having two outward scans and two return scans.

3. A process according to claim 1, further comprising:

forming a module from a series of functions, the series being formed from one or more of the functions, the functions including fast azimuth, slow azimuth, site, basic data, auxiliary data, rear azimuth and flare guidance; and positioning the reinforced preamble at the beginning of the module.

4. A process according to claim 1, further comprising:

arranging from the plurality of functions azimuth function-site function pairs;

forming from at least one of the pairs a module; and positioning the reinforced preamble at the head of the module.

5. A process according to claim 3, wherein the forming step comprises:

forming a module having successively a site function, an azimuth function, a site function, an azimuth function, a site function, an azimuth funtion and two basic data words.

6. A process according to claim 3, further comprising:

transmitting successively a plurality of modules; and forming an assembly by inserting one or more of the functions between the modules, the assembly having a repetitive sequence.

7. A process according to claim 1, further comprising:

varying in time the time interval and the center instant.

8. A transmitter device for increasing the range of an MLS, the transmitter device capable of transmitting at least one angular function, a basic data function and an auxiliary data function, said angular function including one azimuth function or one site function; each function having a preamble preceding an actual function, said transmitter device comprising:

transmitter means;

a sector antenna working cooperatively with the transmitter means for transmitting said preambles, basic data and auxiliary data in the form of a carrier wave phase modulated by data to be transmitted and supplied by said transmitter means;

a scanning antenna working cooperatively with the transmitter means for transmitter at least one reinforced preamble and said at least one angular function in the form of outward and return scans of a wave supplied by said transmitter means;

switching means interposed between said transmitter means and said sector and scanning antennas, the switch means selectively directing the at least one reinforced preamble and functions to the sector and scanning antennas;

control means connected to the switching means for selecting the correct sequencing of transmissions.

9. A device according to claim 8, wherein said control means selectively controls said transmitter means, said switching means and said scanning antenna by means of a status word, the status word having the same number of bits as there are controls to be performed, different successive status words being stored in a memory.

10. A device according to claim 8, wherein said scanning antenna comprises:
a group of N phase shifters;
N radiating elements respectively connected to said N phase shifters;
a logic control circuit connected to said phase shifters, said logic control circuit receiving from said control means the type of scan to be performed, the type of scan including angular functions or reinforced preambles, said logic control circuit further receiving from said control means the scan start time.

11. A receiver device for increasing the range of an MLS, the receiver device capable of receiving at least one reinforced preamble, at least an azimuth function, a site function, a basic data function and an auxiliary data function, each function having a preamble preceding an actual function, the receiver device comprising:
a receiving antenna for intercepting the signal from the at least one reinforced preamble and the functions;
receiving means connected to the antenna for receiving the signal intercepted by said antenna and for supplying an intermediate frequency signal derived therefrom;
means for demodulating and decoding the intermediate frequency signal, the demodulating and decoding means further supplying basic or auxiliary data and identification and time reference data contained in the preambles of the functions;
means for supplying a video signal on the basis of the signal supplied by the receiving means;
means connected to the video signal supplying means for measuring the angle of the intercepted functions on the basis of the video signal and the time reference;
means working cooperatively with the video signal supplying means for processing the at least one reinforced preamble, the processing means including in cascade;
means for converting the video signal into a digital signal;
means connected to the converting means for recognizing and validating the at least one reinforced preamble on the basis of the time interval between two scans of the same type;
means working cooperatively with the recognizing and validating means for determining the time reference contained in the at least one reinforced preamble, the time references being supplied to the angle measurement means.

12. A device according to claim 11, wherein said video signal digital conversion means comprises a sampler and an analog-digital converter; and wherein said device further comprises a threshold device connected downstream of said means for recognizing and validating said reinforced preamble.

13. A device according to claim 11, wherein said digital conversion means comprises a threshold device.

14. A device according to claim 12, wherein said threshold device is followed by a width discrimination circuit.

15. A device according to claim 23, wherein the means for recognizing and validatiang the reinforced preambles carries out correlation by means of a shift register and a multiplier, the shift register delaying signal received thereby by the time interval, and the multiplier forming in real time the product of undelayed and delayed sampled digital signals, the undelayed signals being fed to the multiplier from the analog-to-digital converter and the delayed signals being fed to the multiplier from the shift register.

* * * * *